United States Patent [19]

Chang

[11] 3,750,104

[45] July 31, 1973

[54] METHOD AND APPARATUS FOR SYNCHRONIZING A DYNAMIC RECIRCULATING SHIFT REGISTER WITH ASYNCHRONOUSLY ROTATING MEMORIES

[75] Inventor: Hoy Ying Chang, Detroit, Mich.

[73] Assignee: Burroughs Corporation, Detroit, Mich.

[22] Filed: Oct. 12, 1971

[21] Appl. No.: 188,110

[52] U.S. Cl. .......... 340/172.5

[51] Int. Cl. .......... G06f 13/02

[58] Field of Search .......... 340/172.5

[56] References Cited

UNITED STATES PATENTS

| | | | |
|---|---|---|---|
| 3,037,194 | 5/1962 | Dirks | 340/172.5 |
| 3,235,849 | 2/1966 | Klein | 340/172.5 |
| 3,257,645 | 6/1966 | Levken | 340/172.5 |
| 3,274,559 | 9/1966 | Giroux | 340/172.5 |
| 3,307,151 | 2/1967 | Featherston | 340/172.5 |
| 3,328,772 | 6/1967 | Oeters | 340/172.5 |
| 3,411,142 | 11/1968 | Lee | 340/172.5 |

*Primary Examiner*—Paul J. Henon
*Assistant Examiner*—Sydney R. Chirlin
*Attorney*—Paul W. Fish, Edwin W. Uren et al.

[57] ABSTRACT

A computing system having a plurality of asynchronously rotating memories is described herein. A dynamic recirculating shift register is synchronized with a first memory for receiving information therefrom. After the recirculating shift register has the information stored therein, it is bit position synchronized with the second memory for transfer of information thereto. The algorithm and the method of synchronizing the shift register with the second memory is described herein.

4 Claims, 17 Drawing Figures

INVENTOR
HOY YING CHANG
BY Russel C. Wells
ATTORNEY

METHOD AND APPARATUS FOR SYNCHRONIZING A DYNAMIC RECIRCULATING SHIFT REGISTER WITH ASYNCHRONOUSLY ROTATING MEMORIES

FIELD OF THE INVENTION

This invention relates to data processing equipment in general and in particular to a method for dynamically transferring information between two asynchronously rotating memories.

Prior Art

In many prior art small scale computing systems, additional memory capacity for the system could not be added without replacing the existing memory. In general, the reason for this is basically a function of timing considerations. In particular, the asynchronism between the several memories prevents direct data transfer therebetween.

If an additional rotating memory is required, a d.c. buffer may be used wherein any information transfer is via the buffer. The disadvantage of this type of implementation is that the logic system necessary for transferring information to and from such a d.c. buffer is very expensive.

SUMMARY OF THE INVENTION

In a computing system having a plurality of rotating memories each rotating asynchronously with one another, a method for transferring information between two of the rotating memories utilizes a dynamic recirculating shift register. The information is initially transferred to the shift register which is recirculating in synchronism with the first memory under control of recirculation or clock signals therefrom. At a predetermined bit position of shift register when the information to be transferred has been placed in the shift register, the clock signals from the first memory are removed and the clock signals from the second memory are applied to the shift register. The shift register is then cycled through a predetermined number of stop-shift cycles under control of the clock signals from the second memory to synchronize the bit positions of the shift register with the second memory. When the shift register is synchronized with the second memory, the information contained therein is transferred to the second memory.

DETAILED DESCRIPTION

Figure 1A:
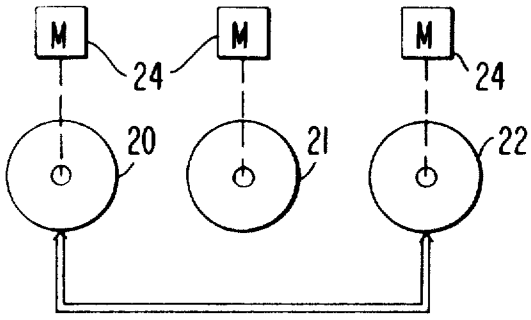
FIG. 1A is a block schematic illustrating the required information flow from a first memory to a second memory.
Figure 1B:
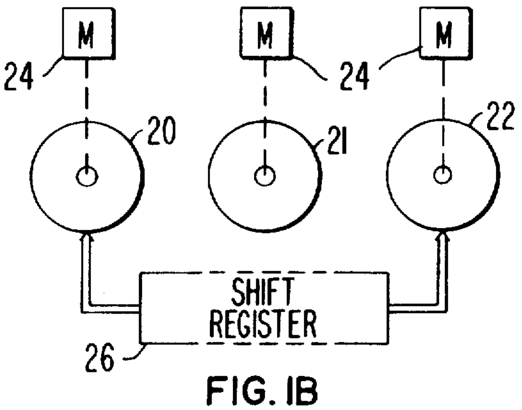
FIG. 1B is a block schematic illustrating the use of a shift register according to this invention to accomplish the information flow of FIG. 1A.

Referring to the figures by the characters of reference, there is illustrated in FIGS. 1A and 1B in schematic form a plurality of rotating magnetic or main memories 20–22 as may be used in a computing system. Such a system may be similar to that described and claimed in U.S. Pat. No. 3,579,192 entitled Data Processing Terminal and assigned to the same assignee. To such a system, additional magnetic memories as shown and described therein may be added and effectively joined together according to the teachings herein. Such memories may be either magnetic disks or magnetic drum memories. Each of the memories is driven by its own motor 24 and, as such, even though the desired speed of rotation of the motor must be held within a very tight tolerance, each memory will in fact rotate at a slightly different speed due to the mechanical structure of the units. Additionally, even though each disk or drum has predetermined fixed positions marked thereon, such as in a disk where a single track identifies each and every bit on the disk, with the separate motors the corresponding bit positions in each of the magnetic memories will not be synchronized with each other.

In applications using the above-described system, it becomes necessary to transfer information from one 20 of the rotating or main memories to another 22 of the other rotating or main memories. In order to do this, an external register or loop or scratch pad memory, such as a dynamic recirculation shift register 26 is used as a buffer for the transfer of information between the two memories 20 and 22. The information to be transferred is removed from the first or sending memory 20 under the control of the clock and the timing of the sending memory to the scratch pad memory 26. After a predetermined amount of the information to be transferred is contained within the scratch pad memory, that memory 26 is then synchronized with the second or receiving memory 22 to which the information is to be transferred. Under the control of the clock and the timing of the receiving memory 22, the information is then transferred to the receiving memory.

Once the information is contained within the scratch pad memory 26 and that memory is synchronized with the second memory 22, any function utilizing the information in the scratch pad memory and the second memory may be performed. Such operations may be stated by the following:

$$A(f)B \rightarrow A,B$$

where A and B represents the information in the scratch pad memory and the information in the main memory. The above states that the result of any operation on A and B may be placed in A and/or B. The following detailed description will describe the method and apparatus used for synchronizing the external loop with the second or receiving memory.

SUMMARY OF OPERATION

The following general steps define the overall method of transferring information from the first rotating magnetic memory 20 to the scratch pad memory 26 and then synchronizing the scratch pad memory with the second rotating magnetic memory 22. Step one; stop the loop or dynamic recirculation of the scratch pad memory 26 at a word marker on the first memory after the information is transferred from the first memory to the loop. Step two; the clock input 28 to the loop 26 is then switched from the clock of the first memory 20 to the clock of the second memory 22. This may be accomplished by the logic circuit 30 illustrated in FIG. 2. Step three; after the second memory 22 clock is switched to the loop 26, a stop-shift cycle is entered at a predetermined bit position, a modulo marker, of the second memory 22 to synchronize the corresponding bit positions of the loop 26 with the corresponding bit positions of the second memory. At the end of this stop-shift cycle, the bit positions of the second memory 22 and the data may be then transferred from the loop 26 to the second memory.

THEORY OF OPERATION

For the purpose of discussion, the following definitions will apply to the terms as will hereinafter be used.

- L The number of bits in the loop and is the length of one unit of information transfer. This unit of information length is the same on each of the memories. This is a fixed non-negative integer based on the system.
- Word A unit of information.
- Track Each of the rotating main memories has at least one endless information path thereon containing data information.
- $x$ A non-negative integer defining the number of loop lengths on a given track of memory. For most memories $x$ is greater than one.
- $n$ This is the number of extra bits or guard bits per word on the track. These bits function to guard the succeeding message on the track and remove it from under the magnetic influence of the preceding message and is generally a characteristic of the system. Typically the number of bits on a track in accordance with the above definitions is $x(L+n)$. Loop recirculation must be stopped during these $n$ bits.
- Word Marker This is any fixed bit position within a word and typically is bit position zero or the first bit position in the word.
- Synchronization The loop is in synchronization with the memory if the same bit position appears on the output of the loop at every word marker time.
- $f$ This is the number of bit times the loop can be stopped without losing data. If the loop is an AC loop then periodically, the loop must be recharged to maintain the data contained therein. $f$ is the maximum number of bit times between each recharge cycle. $f$ must be greater than or equal to $n$ in order for the loop to contain any information from the memory track. If $f$ is greater than or equal to $(L+n)$ or if the loop is a d.c. loop then synchronization between the loop and a memory may be completed by simply stopping the recirculation of the loop at a word marker of the first memory and restarting recirculation of the loop at a word marker of the second memory.
- $f$ The length of each stop-shift cycle.
- $m$ The number of stop-shift cycles.
- Modulo Marker A predetermined bit position on each track which is used to initiate the synchronization of the recirculation register with the track. There is at least one modulo marker per track and at most one modulo marker for each word on the track.
- Modulo X Counter A cyclic counter counting in the sequence 0, 1,...X−1, 0, 1...

The relationship between a modulo marker and a succeeding useable word marker involves the selection of several parameters. After the clock to the loop 26 has been switched from the first memory 20 to the second memory 22, the loop continues to be shifted until a modulo marker is detected on the second memory 22. Once the modulo marker is detected, the stop-shift cycle is entered to synchronize the loop 26 and the second memory on or before the next useable word marker.

The known parameters which are fixed by physical characteristics of the memories 20–22 and the overall computing system are $L$, the number of bits in a word; $n$, the number of guard bits; and $f$, the number of bit times or clock pulses during which the loop 26 can be stopped without losing the information contained therein. From these parameters, the modulo marker-word marker relationship, the number $m$ of stop-shift cycles and the number $f$ of bit times per each stop-shift cycle can be determined.

After the clock to the loop 26 is switched from the first memory 20 to the second memory 22, the loop is shifted S times until a modulo marker is found on the second memory. The letter S can be any non-negative integer including zero. Once the modulo marker is found, there must be enough time to synchronize the bit positions of the loop 26 and the second memory 22 before the desired or useable word marker is found on the second memory. This will involve a period of time when the loop is not being shifted and as defined above this period of time cannot be greater than $f$ bit times, a characteristic of a loop. The following mathematical procedure is used to define the relationship between the module marker and the next useable word marker.

The first step when a modulo marker is found is to divide the number of shifts $S$ by the length of the loop which is $L$. This division results in a quotient Q and a remainder A. $S/L = Q+A/L$ If S is counted in a modulo L counter, this division is automatic and the number in the counter is equal to A. Regardless of the value of A which may be between zero and (L−1), the loop will be returned to its original position, that is with bit zero at the output, if the loop is shifted an additional (L−A) bit times. The clock is then turned off until the next useable word marker at which time the loop 26 and the second memory 22 will be in synchronism. The next useable word marker must be within $f$ bit times or the information in the loop is lost and the loop and the memory will not be synchronized. To accomplish (L−A) shifts, there must be at least L bit times between the modulo marker and the next useable word marker. Note that (L−A) shift times is equivalent to A stop times in *L* bit times.

When A is greater than *f'* it is necessary to provide a number of stop-shift cycles, *m*, where each stop cycle is no more than *f'* bit times and the total number of the shift times in all shift cycles is (L−A). At the end of *m* stop-shift cycles, the useable word marker is within *f'* bit times.

These above identified conditions can be satisfied by defining L as having two factors *m* and *f* such that $$L=mf$$

where $m$ = the number of stop-shift cycles.

$f$ = the number of pulses for each cycle.

For ease of implementing the stop-shift cycles the value of $A/m$ should be an integer so that the make-up of each cycle will be the same. With the number of shifts the same for each cycle, it will never be necessary to stop the full length of each cycle because the same effect in a recirculation shift register of length L can be achieved by shifting the full length of each cycle. This is so because zero shifts and L shifts in a recirculation shift register of length L result in the register ending in the same position. However, since each cycle could be stopped for *f'* bits without losing the information in the loop and then followed by one shift bit to recharge the loop, the upper limit of *f* is defined as being no greater than $(f'+1)$.

As stated above, it is desirable to have the value A exactly divisible by *m*. This can be achieved by shifting the loop past the modulo marker until A is divisible by *m*. If A is not divisible by *m* at the modulo marker, then it will be divisible by *m* within $(m-1)$ pulses beyond the modulo marker.

Figures 2, 3, 4:
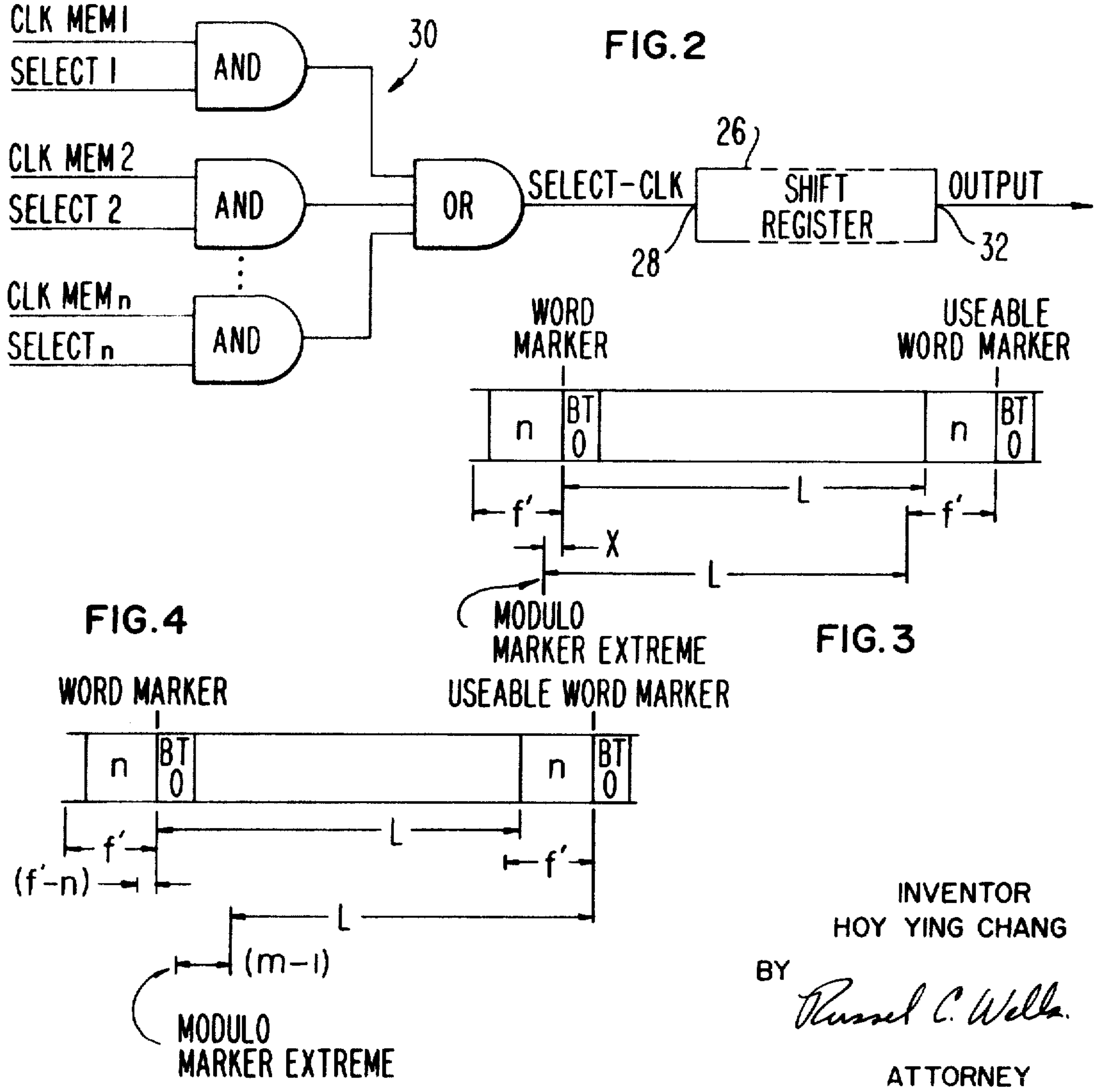
FIG. 2 is a logic circuit illustrating the logic for switching the clock signals to the shift register.
FIG. 3 is a mathematical schematic illustrating one extreme in the positioning of a modulo marker.
FIG. 4 is a mathematical schematic illustrating the other extreme in the positioning of a modulo marker.

From the above, the positioning of the modulo marker is defined. A modulo marker can be no more than $(L+f')$ bit times and no less than $(L+m-1)$ bit times before a useable word marker as illustrated in FIGS. 3 and 4. From the above, the following relationship is defined $$(L+f') \geq (L+m-1)$$

and the number cycles is bounded as $$m \leq (f'+1)$$

Figure 7:
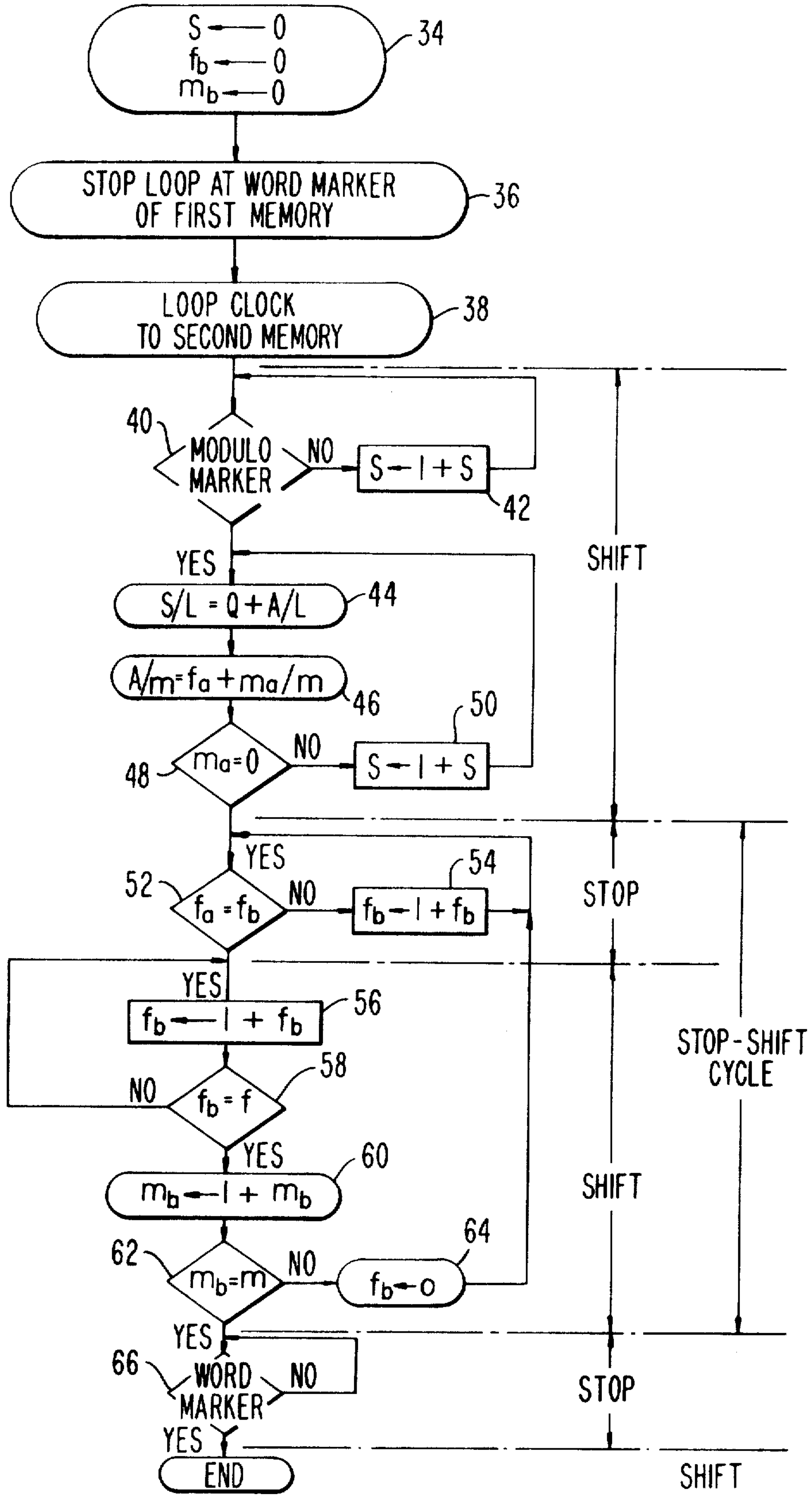
FIG. 7 is the general algorithm of the method.
Figures 8A, 8B, 8C:
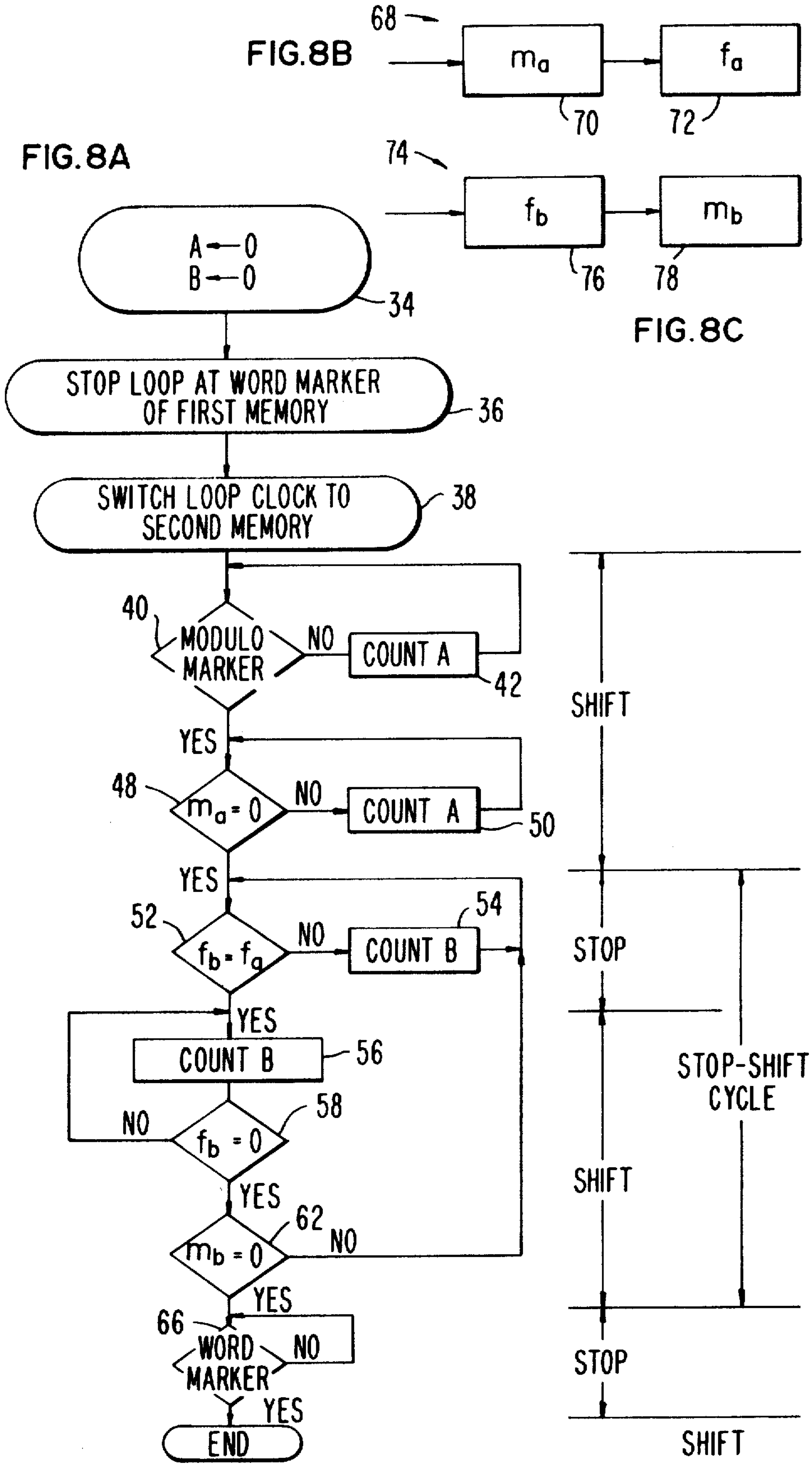
FIG. 8A is the general algorithm implemented with modulo counters.
FIG. 8B is a block diagram of the A modulo counter.
FIG. 8C is a block diagram of the B modulo counter.

Once the modulo marker is selected, the following general and specific algorithms of FIGS. 7 and 8A are used to compute the number of stop pulses and the number of shift pulses within each stop-shift cycle.

Loop Shift Register

As previously indicated, the loop is a dynamic *L* bit shift register wherein each stage is serially connected via its input and output to the adjacent stages.

Figure 5:
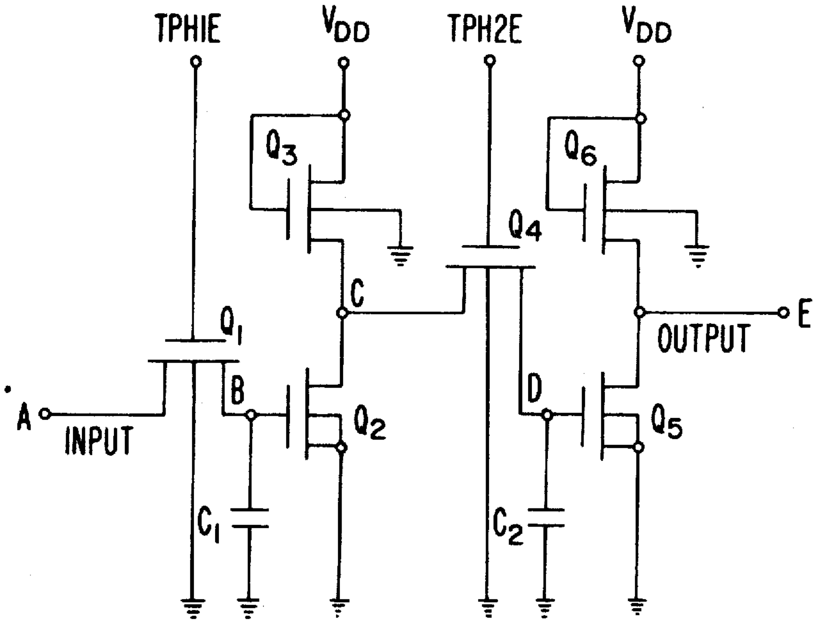
FIG. 5 is a schematic of one stage of the shift register.

FIG. 5 depicts the configuration of a typical stage of the loop. Each stage is operatively divided into an input section and an output section. Information is admitted into the input section by the phase one clock pulse TPH1E and is transferred to the output section by the phase two clock pulse, TPH2E.

In the preferred embodiment, each stage comprises six MOS insulated gate field-effect transistors, Q1 through Q6. The first three transistors Q1, Q2 and Q3 are used in the input section; and the remaining three transistors Q4, Q5 and Q6 are used in the output section. The first transistor in each section, namely, Q1 and Q4, function as transfer gates, the second transistors in each section, Q2 and Q5 function as inverters and the third transistors Q3 and Q6 function as the load resistors and C1 and C2 represent the parasitic capacitance of each section and it is this capacitance which temporarily stores the information in each section.

Figure 6:
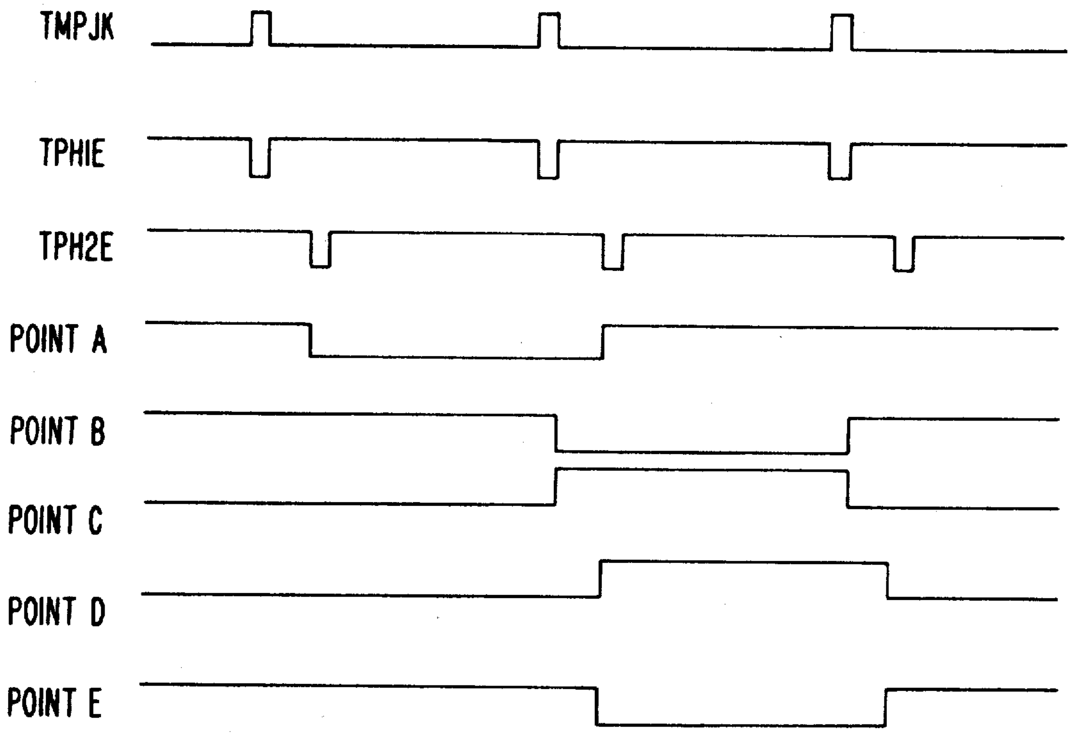
FIG. 6 is a timing diagram of the operation of FIG. 5.

The waveforms of FIG. 6 illustrate the relationship between the several transistors and the three clock signals, TMPJK, TPH1E and TPH2E. The first waveform, TMPJK represents the basic clock signal of the system and the next two waveforms represent the phase clocks TPH1E and TPH2E which are derived therefrom. The function of TPH1E is to transfer information into the input section and the function of TPH2E is to transfer information from the input section to the output section.

The waveform labeled Point A, depicts an information bit as it appears at the input A of the input section. For the purposes of discussion the logic of the computer is positive, i.e., binary "1" is represented by +5 volts and binary "0" is represented by 0 volts, the information being transferred into the loops must be inverted; therefore, the waveform Point A represent a binary "1". At TPH1E the input signal is transferred to Point B by driving the first transistor Q1 into conduction. With Q1 conducting the capacitance C1 is charged through the transistor Q1 to the negative potential of the input signal. When C1 becomes charged, the inverter transistor Q2 is driven into conduction causing Point C to approach ground potential. At the termination of TPH1E, the input transistor Q1 is driven out of conduction but the negative charge on C1 keeps Q2 in conduction. Since the leakage current in these devices is extremely small, transistor Q3 will remain in conduction for a period of time much greater than the interval between successive phase clocks.

The clock signal TPH2E which controls the output sections of the stage, drives the second transfer transistor Q4 into conduction to initiate transfer of the input data to the output section. The capacitance C2 charges to the ground potential of the signal at Point C thereby driving the second inverting transistor Q5 into conduction lowering the voltage at Point E to approximately ground. At the termination of TPH2E, the transfer transistor Q4 is driven out of conduction and the information signal, represented by the waveform Point A has thus been transferred from the input section at Point A by TPH1E to the output section at Point B by TPH2E which is represented by the waveform Point E.

SYNCHRONIZATION ALGORITHM

Referring to FIG. 7, there is diagrammatically shown the general algorithm for transferring data from a first main memory 20 through an external loop 26 to a second main memory 22. Each operation defined in the rectangular boxes requires one clock time and all other operations including the decisions identified in the diamonds do not require any additional clock times. Several of the steps of the algorithm are contained between lines labeled "shift" and "stop". The term shift refers to the recycling of the loop and the transferring of data information from one stage to another.

The operation defined by the algorithm takes place after the information to be transferred is removed from the first memory 20 and stored in the external loop 26. The loop 26 is then stopped at a word marker of the first memory 20 and the clock signals from the second memory 22 will be applied to the clock input 28 of the loop 26 to shift the loop. When the loop is stopped, the information contained in the loop is in a predetermined order BT0, BT1...BT(L−1) with bit zero at the output 32. Each clock pulse from the second memory 22 that is applied to shift the loop is counted in a S storage until a modulo marker in the track of the second memory 22 is found.

The first statement 34 in the algorithm states that the S storage is replaced by zero and two other storage sections $m_b$ and $f_b$ are also replaced by zero. The next two statements 36 and 38 in the algorithm indicate, as hereinabove explained, that the loop 26 is stopped at a word marker of the first memory 20 and the clock to the loop is switched from the first memory 20 to the second memory 22. Next, the second memory 22 is checked, as indicated in the decision box 40, for a modulo marker. If the modulo marker is not found, the content of the S storage, as stated in the box 42, is incremented by one as stated in the algorithm by S ← (1+S). This can be accomplished by arithmetic or counting means. During this operation, as previously indicated, the loop 26 is being shifted. These two steps 40 and 42, the testing and the incrementing, are repeated until the modulo marker from the second memory 22 is found. When the modulo marker is found, the content of S storage is divided by L. The result 44 of this division is a quotient, Q, and a remainder, A. The remainder A is further divided 46 by $m$, the number of stop-shift cycles, to give a quotient $f_a$ and a remainder $m_a$. The remainder $m_a$ is then tested 48 as to whether or not it is equal to zero and if it is not equal to zero, then the algorithm goes to a step 50 where the content of the storage S is incremented by one. The two divisions 44 and 46 follow and the remainder $m_a$ is again tested. These operations 44, 46, 48 and 50 are repeated until the remainder $m_a$ equals zero.

When $m_a$ is equal to zero, the shifting of the loop 26 is stopped and the algorithm proceeds to the next step 52 where the quotient $f_a$, which is equal to the number of stop cycles, is tested to see whether or not it is equal to $f_b$. If $f_a$ is not equal to $f_b$, then the algorithm shows that the loop remains in the stop portion of the stop-shift cycle and proceeds to the step 54 where $f_b$ is replaced by $(1+f_b)$ and the test $f_a = f_b$ is again performed. This continues until $f_a = f_b$ then the algorithm enters the shift portion of the stop-shift cycle. The object of the stop-shift cycles is to recirculate the loop (L−A) bit times. The number $f_a$ indicates the number of pulses which the loop 26 must be stopped for each stop-shift cycle. The number $(f - f_a)$ indicates the number of pulses which the loop 26 must be shifted during the shift portion of each stop-shift cycle. Each cycle begins with the stop portion and ends with the shifting portion. Note $f_a$ can be equal to zero.

Returning to the next step 56 in the algorithm, $f_b$ is replaced by $(1+f_b)$ in the shift portion of the stop-shift cycle. After $f_b$ is replaced by $(1+f_b)$, $f_b$ is tested 58 to determine whether or not it is equal to $f$, the length of the stop-shift cycle. If $f_b$ is not equal to $f$, the algorithm returns to the step 56 where $f_b$ is replaced by $(1+f_b)$ on the next clock pulse. During this sequence of two operations 56 and 58, the loop 26 is being shifted by each successive clock from the second memory 22. When $f_b = f$, the algorithm then moves to the step 60 where $m_b$ is replaced by $(1+m_b)$. Function of this step 60 is to count the number of cycles in the stop-shift cycle. At the end of this step 60, $m_b$ is tested 62 to determine whether or not it is equal to $m$ and if it is not, the algorithm proceeds to the step 64 where $f_b$ is replaced by zero and returns to the stop portion of the cycle and in particular to the step 52 where $f_b$ is tested for equality with $f_a$.

However, when $m_b$ is equal to $m$, the algorithm proceeds to the step 66 where the loop 26 is stopped and the word marker is looked for on the second memory 22. At this time the loop can be stopped a period of time no more than $f$ bit times and during this period of time the loop 26 is at the predetermined position with bit zero at the output 32. When the word marker is found, the loop 26 will then be shifted in synchronism with the bit positions on the second memory 22.

The algorithm as illustrated in FIG. 7 and described hereinabove applies to any general solution wherein information is to be transferred between two asynchronously rotating main memories. As a further illustration of the algorithm and in particular as applied in a preferred embodiment, the following description illustrates the general algorithm of FIG. 7 implemented with modulo counters as illustrated in FIGS. 8A, 8B and 8C.

General Algorithm/Modulo Counters

Referring to FIG. 8A there is diagramatically illustrated the algorithm of FIG. 7 wherein the storage S has been implemented with a modulo L counter containng A 68. As indicated in FIG. 8B, the modulo L counter containing A and labeled A is comprised of a $m_a$ portion 70 which is a modulo $m$ counter and a $f_b$ portion 72 which is a modulo $f$ counter. As indicated in FIG. 8C, there is a second modulo L counter labeled B 74 comprising a $f_b$ portion 76, a modulo $f$ counter and a $m_b$ portion 78, a modulo $m$ counter. The operation of this algorithm is identical to that of FIG. 7.

Preferred Embodiment

In the preferred embodiment the following fixed constants based on the system are:

$L = 64$ (MBTO - MBT63)

$f = 16$ $n = 5$ (MBT64 - MBT68)

Word Marker = MBTO and in accordance with the previous statements the following factors are derived:

$f = 16$ $m = 4$ modulo marker = MBT65

Figures 12, 13:
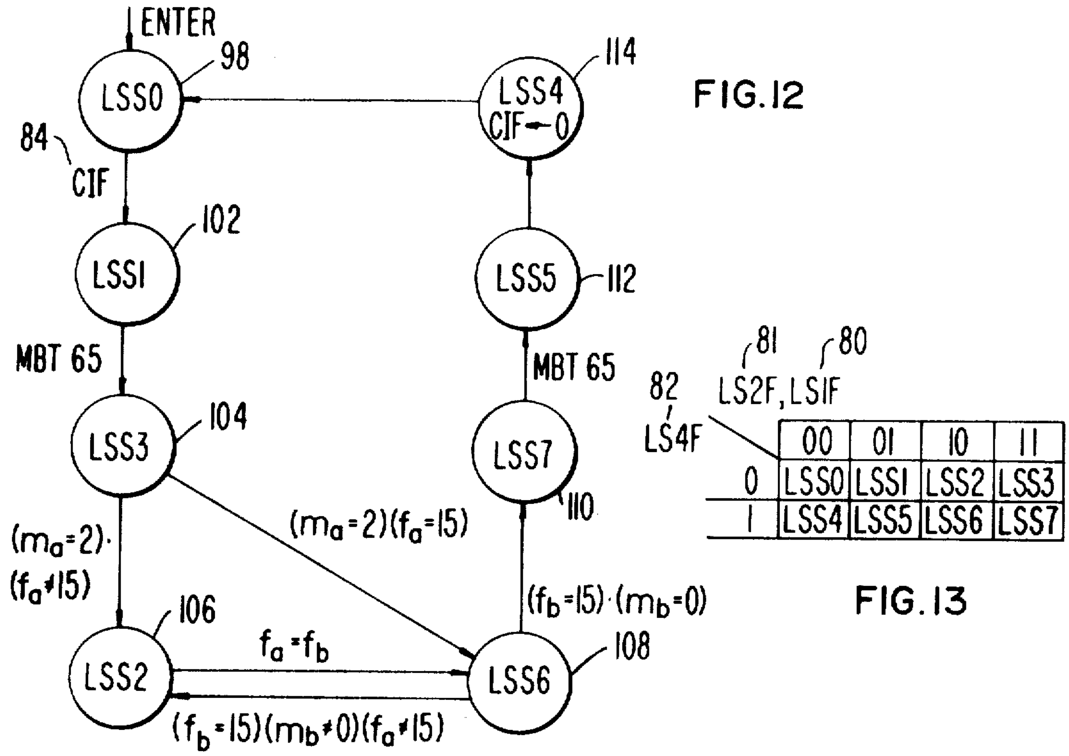
FIG. 12 is the state machine diagram of the implementation of the algorithm of FIG. 8A.
FIG. 13 is the Karnaugh map of FIG. 12.

Referring to FIG. 12 there is illustrated the state machine diagram of the state machine implementing the algorithm of FIG. 8A. This state machine is comprised of eight states which are identified by the status of three flip flops LS1F 80, LS2F 81 and LS4F 82. The functions of the several states are enumerated in the table below along the status of the three flip flops as shown in the Karnaugh map of FIG. 13.

| State | Flip Flop Status | Function |
|---|---|---|
| LSS0 | 000 | Initialize algorithm — normal loop shifting. |
| LSS1 | 001 | Shift loop with second memory clock until modulo marker is found. Count shifts. |
| LSS2 | 010 | Stop shifting of loop. Count $f_b$ until $f_b = f_a$. |
| LSS3 | 011 | Shift loop until $m_a = 2$. Count $m_b$ and $f_b$ once upon existing. |
| LSS4 | 100 | CIF ← O |
| LSS5 | 101 | Timing state. |

| | | |
|---|---|---|
| LSS6 | 110 | Shift loop and count $f_b$ to 15. |
| LSS7 | 111 | Look for word marker. |

Figure 14:
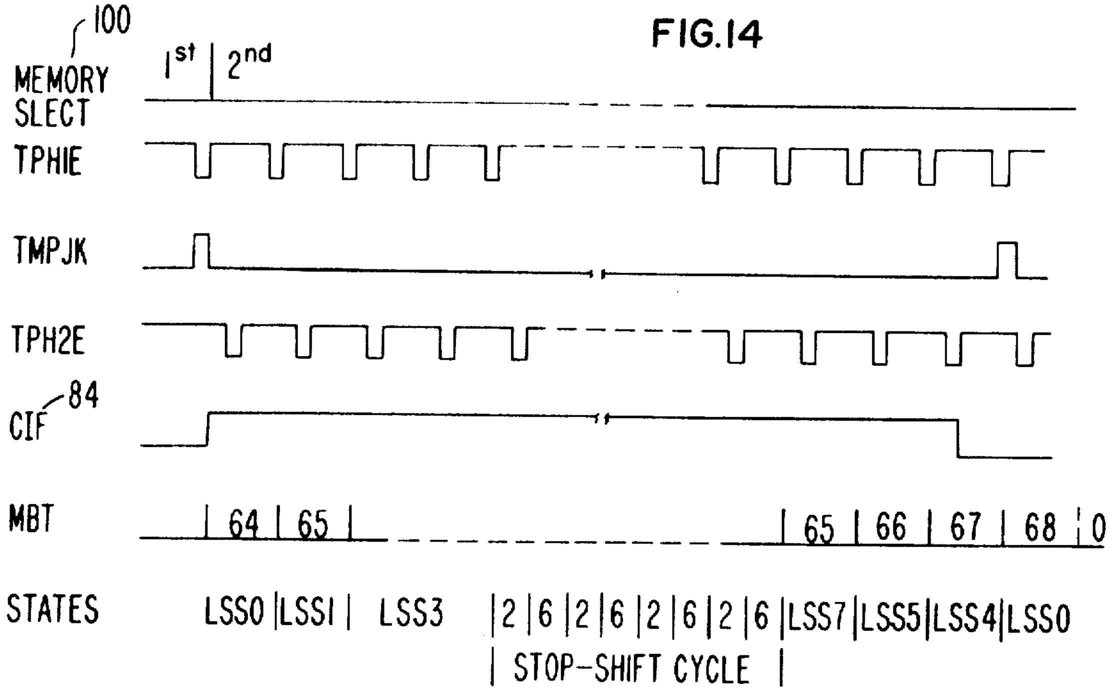
FIG. 14 is a timing diagram relating to the state machine of FIG. 12.

The signal CIF 84 indicates that the clock to the loop 26 has been switched to the second memory 22 and the loop is not in synchronism therewith. FIG. 14 illustrates in an abbreviated form, a timing diagram illustrating the relationship between the several states of the state machine for a particular value of A and the timing pulses within the system.

In the timing diagram of FIG. 14, the main system clock signal which is used to implement and function with the logic elements of the system is labeled TMPJK. The timing diagram illustrates that during the time period when the state machine of FIG. 12 is being operated, this timing signal or clock is effective stopped or inhibited. The signal CIF 84 functions to inhibit the clock until the loop 26 is synchronized with the second memory 22.

Associated with the main clock signal are two phase clocks TPH1E and TPH2E. These two clocks function to shift the loop. The loop 26 in the preferred embodiment is a 64 bit MOS recirculating shift register as hereinabove described. The two phase clocks cooperate to shift information from stage to stage within the recirculating shift register. When the main clock signal is off, the clock signal TPH1E is being generated and used to shift the state machine from state to state.

Figure 9:
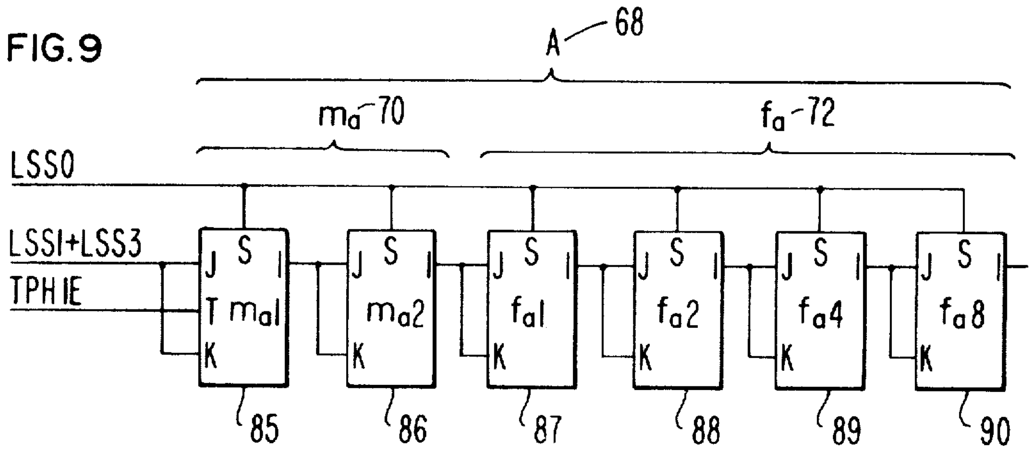
FIG. 9 is a schematic of the A ripple counter of FIGS. 8A and 8B.
Figure 10:
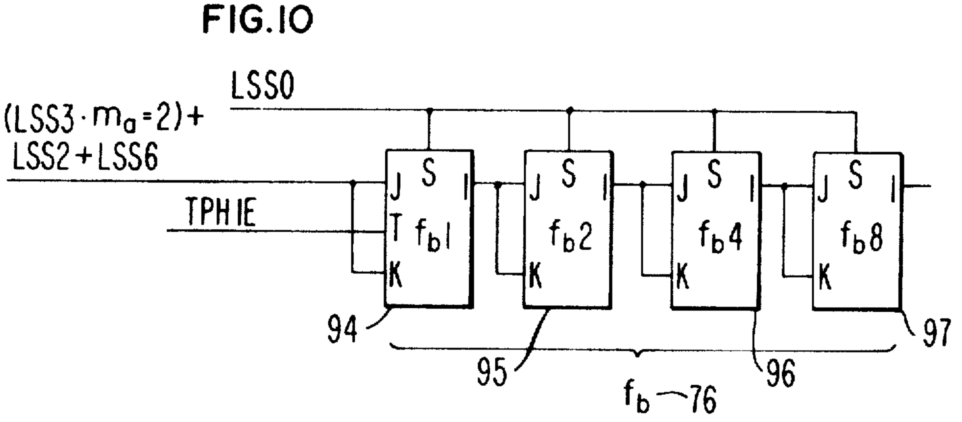
FIG. 10 is a schematic of the $f_b$ ripple counter of FIGS. 8A and 8C.
Figure 11:
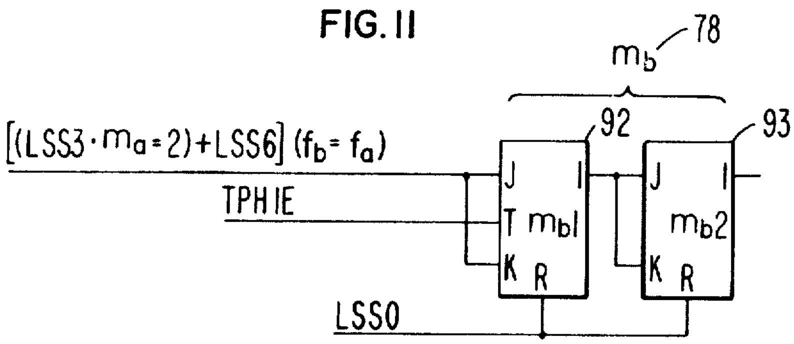
FIG. 11 is a schematic of the $m_b$ ripple counter of FIGS. 8A and 8C.

Counter A 68 in the algorithm of FIGS. 8A and 8B is illustrated in FIG. 9 as a six stage 85–90 modulo L ripple counter initially set to 63. The first two stages 85 and 86 are labeled $m_a$ and the last four stages 87–90 are labeled $f_a$. The B counter 74 in the algorithm of FIGS. 8A and 8C is illustrated in FIGS. 10 and 11. The $m_b$ section 78 of the B counter is illustrated in FIG. 11 as a two stage 92 and 93 ripple counter initially set to zero. The $f_b$ portion of the B counter is illustrated in FIG. 10 as a four stage 94–97 ripple counter initially set to fifteen. All of the counters 68, 76 and 78 are count-up counters, are triggered by the TPH1E clock signal at the appropriate state machine time and are initially set in LSS0.

The state machine is entered when the second memory 22 clock is connected to the loop 26. The machine at this time is in state zero or as indicated in the state machine diagram state LSS0 98. LSS0 is the abbreviation for Loop Synchronizing State Zero. As previously indicated, when the information to be transferred has been completely removed from the first memory 20 and is stored in the loop register 26, the clocking system is switched from the first memory 20 to the second memory 22. This is indicated on the timing diagram by the signal 100 labeled memory select. At the end of the last bit of information to be transferred between the first memory and the loop which is at MBT63 time, CIF 84 is set to 1. This is shown graphically on the timing diagram.

With CIF 84 and the clock TPH1E, the state machine progresses from state zero to state one 102 for further processing. Basically during state zero 98, the counters $f_a, f_b, m_a, m_b$ are all preset as indicated in their respective FIGS. 9–11. During state one 102 the loop 26 is being shifted by the two-phase clocks and the second memory 22 is searched for the modulo marker. When the modulo marker is found, which in the preferred embodiment corresponds to MBT65, the state machine changes from state one to state three 104. In state three the A counter 68 is continued to be counted until the $m_a$ portion 70 of the A counter is equal to two. In the preferred embodiment, since the $m_a$ portion 70 is a two stage ripple counter, the maximum number of pulses, namely the TPH1E pulses which will occur in state three is three pulses.

While in state three 104, as previously indicated, the loop 26 is being shifted and the $m_a$ portion 70 of the A counter 68 is being checked. When the $m_a$ portion 70 is equal to two, the state machine will progress to either state two 106 or state six 108 depending upon the condition of the $f_a$ portion 72 of the A counter 68. If the $f_a$ portion 72 is equal to 15, the state machine progresses to state six 108, however, if the $f_a$ portion is not equal to 15, the state machine progresses to state two 106.

State two 106 and state six 108 comprise the stop-shift cycle to bring the loop 26 into synchronization with the second memory 22. In particular, state two 106 is the stop portion of the cycle and state six 108 is the shift portion of the cycle. Whenever the state machine is in state six, the loop 26 is being shifted on each pair of phase clocks TPH1E and TPH2E. If $f_a$ is equal to 15 in state three 104, and immediately upon entering state six 108 this indicates that the loop 26 is at the predetermined portion with bit zero at the output 32. The state transition from state three 104 to state six 108 also counts the $m_b$ counter 78 from zero to one and the $f_b$ counter 76 from fifteen to zero. The state machine will remain in state six 108 until $m_b$=0 and $f_b$=15 and the loop 26 has been shifted L times which in the preferred embodiment is 64 times.

If in state three 104, $f_a$ is not equal to 15, the state machine progresses from the state three to state two 106 which is a stop portion of the stop-shift cycle. This state transistion from state three 104 to state two 106 counts the $m_b$ counter 76 from zero to one and counts the $f_b$ counter 76. The state machine remains in state two 106 for a number of pulses according to the number in the $f_a$ counter 72 as indicated on the following table:

| | $f_a$ | | | State 2 | State 6 |
|---|---|---|---|---|---|
| $f_a8$ | $f_a4$ | $f_a2$ | $f_a1$ | Number of Bits Stopped | Number of Bits Shifted |
| 0 | 0 | 0 | 0 | 1 | 15 |
| 0 | 0 | 0 | 1 | 2 | 14 |
| 0 | 0 | 1 | 0 | 3 | 13 |
| 0 | 0 | 1 | 1 | 4 | 12 |
| 0 | 1 | 0 | 0 | 5 | 11 |
| 0 | 1 | 0 | 1 | 6 | 10 |
| 0 | 1 | 1 | 0 | 7 | 9 |
| 0 | 1 | 1 | 1 | 8 | 8 |
| 1 | 0 | 0 | 0 | 9 | 7 |
| 1 | 0 | 0 | 1 | 10 | 6 |
| 1 | 0 | 1 | 0 | 11 | 5 |
| 1 | 0 | 1 | 1 | 12 | 4 |
| 1 | 1 | 0 | 0 | 13 | 3 |
| 1 | 1 | 0 | 1 | 14 | 2 |
| 1 | 1 | 1 | 0 | 15 | 1 |

In state two 106, as indicated by the algorithm, the $f_b$ counter 76 is counted and after each count the $f_b$ counter is compared with the $f_a$ counter 72 for equality. Until the count in $f_b$ equals the count in $f_a$, the state machine remains in state two 106. When $f_b$ equals $f_a$ the state machine progresses to state six 108, the shift portion of the stop-shift cycle. The state machine will remain in state six until the $f_b$ counter 76 is counted to 15. When the counter is equal to 15, the $m_b$ counter 78 is tested for zero and if not, the $m_b$ counter 78 is counted once and the state machine returns to state two 106. As previously indicated, the $m_b$ counter 78 counts the number of stop-shift cycles to be performed, and when this count returns to zero this indicates that four stop-shift cycles have been executed. The state machine goes back and forth between state two 106 and state six 108 for four stop-shift cycles. At the end of the fourth cycle, when the state machine is in state six 108, the state machine will progress to state seven 110.

In state seven 110, the state machine looks for a predetermined pulse of the second memory 22 and in particular, as indicated in the state diagram, this is MBT65. At this time, the loop 26 is in its proper orientation in a predetermined order wherein bit zero is at the output 32 of the loop 26. During the next states, namely states five 112 and four 114, the loop 26 is not shifted while the pulses coming from the second memory 22 are in the "*n*" or guard portions of the word. When MBT65 is found, the state machine progresses from state seven 110 to state five 112 where it remains for one count and then to state four 114. In state four 114, CIF 84 is reset to zero and simultaneously the state machine progresses from state four 114 to state zero 98. At the first MBT0 after the state machine returns to state zero 98, the loop 26 and second memory 22 are in synchronism and information transfer will take place under control of the second memory 22.

There has thus been shown and described a method and the necessary apparatus for transferring information between two asynchronously rotating memories. The information to be transferred from the first or sending memory to the second or receiving memory is temporarily stored in a recirculating shift register or loop. The loop is synchronized with the first memory by the clock signals from the first memory being applied to the loop. After the information is completely stored in the loop, the clock signals from the first memory are removed and the clock signals from the second memory are applied to the loop. The loop is then bit position synchronized with the second memory through a predetermined number of stop-shift cycles. When the loop is synchronized with the second memory, any function utilizing the information stored in the loop and the information stored in the second memory may be performed.

What is claimed is:

1. The method for transferring binary encoded information from a first rotating memory to a second rotating memory wherein both memories are rotating asynchronously the transfer via a shift register adaptable to be synchronized with each of the rotating memories said method comprising the steps of:

shifting the shift register in synchronism with each bit position of the first memory, transferring a unit of information from the first memory to the shift register synchronously with the first memory until a predetermined bit position on the first memory is detected, stopping the shifting of the shift register when said predetermined bit position is detected, switching the shifting signals to the shift register from the first memory to the shifting signals of the second memory, synchronizing the bit positions of the shift register to the corresponding bit positions of the second memory, and then transferring the unit information from the shift register to the second memory.

2. The method according to claim 1 wherein the step of synchronizing the bit positions of the shift register to the bit positions of the second memory includes the steps of:

determining the number of bit positions which the shift register is out of synchronization with the second memory, dividing the number of determined bit positions by a predetermined number representing a number of stop-shift cycles obtaining a quotient representing the number of bit positions to be stopped in each cycle, determining from the total number of bit positions of the shift register the number of bit positions for the register to be shifted, dividing the number of bit positions for the register to be shifted by the predetermined number representing the number of stop-shift cycles for obtaining a cycle number representing the number of bit positions to be shifted in each cycle, cycling the shift register through the predetermined number of stop-shift cycles stopping the shift register according to said quotient and shifting the shift register according to said cycle number, and then searching the second memory at the end of the predetermined number of stop-shift cycles for a predetermined bit position on said second memory.

3. A system for transferring binary encoded information from a first rotating memory to a second rotating memory wherein both memories are rotating asynchronously said system comprising:

a first clock signal generating means responsive to a timing signal track on the first memory, a recirculating shift register adapted to receive binary encoded information, said shift register having a clock signal input for receiving said first clock signal for shifting said shift register, means for coupling said first clock signal generated from said first generated means to said shift register for shifting said shift register in synchronism with said first memory, means for transferring information from said first memory to said shift register, a second clock signal generating means responsive to a timing signal track on the second memory, means for switching the clocking signals at the clocking signal input of said shift register from said first clock signal of said first memory to said second clock signal of said second memory, means for synchronizing the bit positions of said shift register with the corresponding bit positions of said second memory, and means for transferring information from said shift register to said second memory when said shift register and said second memory are synchronized and a predetermined bit position is detected on said second memory.

4. The system according to claim 3 wherein said means for synchronizing includes:

means for detecting a first predetermined bit position on said second memory, counting means responsive to said second clock signals for counting the number of said second clock signals shifting said shift register and responsive to said detection means for inhibiting said counting means, means for cycling said shift register to its normal bit position, and means for detecting a second predetermined bit position on said memory indicating said shift register and said second memory are synchronized.

* * * * *